H. LA F. FINZEL.
DEMONSTRATING CAMERA.
APPLICATION FILED JUNE 13, 1911.
1,019,622.
Patented Mar. 5, 1912.
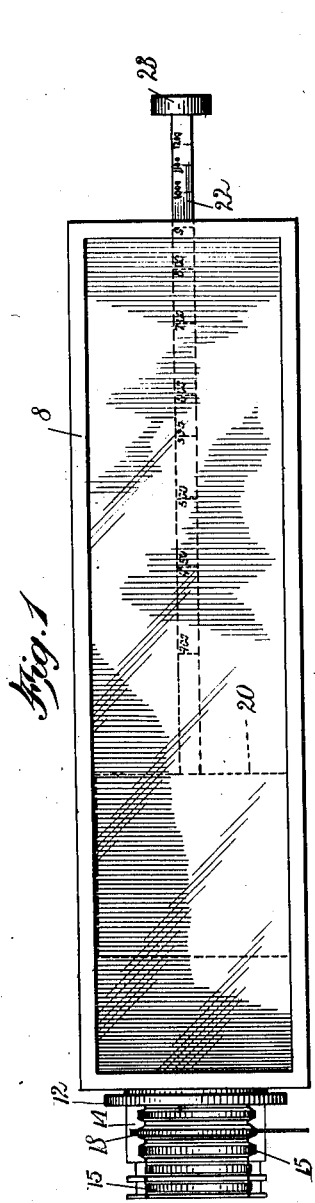
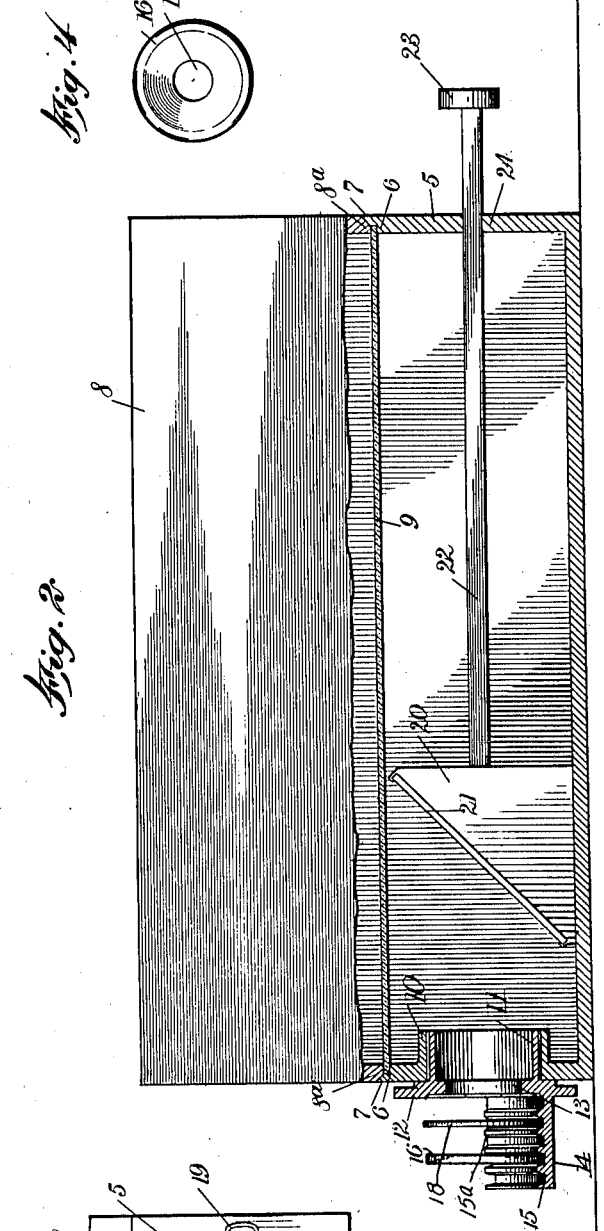
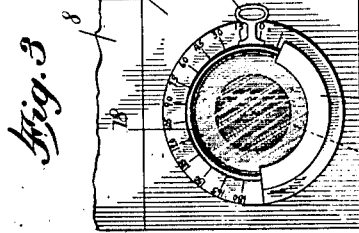
WITNESSES
INVENTOR
Henry L. Finzel
BY
ATTORNEYS ly,
UNITED STATES PATENT OFFICE.

HENRY LA FAYETTE FINZEL, OF MILLEDGEVILLE, ILLINOIS.

DEMONSTRATING-CAMERA.

1,019,622.  Specification of Letters Patent.  Patented Mar. 5, 1912.

Application filed June 13, 1911. Serial No. 632,865.

*To all whom it may concern:*

Be it known that I, HENRY LA FAYETTE FINZEL, a citizen of the United States, and a resident of Milledgeville, in the county of Carroll and State of Illinois, have invented a new and Improved Demonstrating-Camera, of which the following is a full, clear, and exact description.

My invention relates to optics, my special design being to provide a demonstrating camera which will enable the optometrist, oculist, or other operator to explain, demonstrate, or illustrate, for persons whose eyes have been tested, the nature, kind and degree of refractive error, by means of images, assisted by movements of certain parts of an appropriate instrument, then to verify the same by means of lenses used in the test, singly or in combination, as the case may be.

More particularly stated, my invention comprehends a device having primarily the nature of a camera, and provided with means whereby lenses of various kinds may be interchangeably mounted, and adjusting mechanism whereby images formed by aid of said lenses are thrown upon a screen, the error or distortion sought to be corrected by the lens being made apparent from a blurring or a clarifying, as the case may be, of one or more parts of the image thus formed.

My demonstrating camera is of special adaptability for the use of students and instructors in schools and colleges, but is of more practical use to optometrists, oculists, and opticians. While it may be employed for many purposes, it is also appropriate for assisting in the study of optics generally.

It may be employed to advantage in the study of the nature of lenses. That is, to the extent that lenses may be studied by the aid of the images formed by them. In transposition of the lenses the operator is enabled to ascertain whether or not the work is correct. My device when employed by students or by professional men, as the case may be, confers upon the operator a familiarity with the effects produced by lenses of various kinds when exposed to light, thus verifying the various theories taught or studied.

Moreover, my demonstrating camera gives the patient a confidence in the ability and accuracy of the work of the optometrist or other operator. This is because a result may be predicted by the optometrist and then verified by aid of the camera, so that the patient can readily see that there is no guesswork and that the prediction is correct. For instance, an optometrist or an oculist may test a person's eyes and determine, I will say, a certain amount of error of refraction; he then tells the patient that he will prove by the camera that the kind and degree of error of refraction noted, is really present. Then by adjusting the camera with one or more appropriate lenses and bringing it to a focus, he proves to the patient that his observations are correct. In doing this he wins the confidence of the patient.

Reference is to be had to the accompanying drawings forming a part of this specification, in which similar characters of reference indicate corresponding parts in all the views.

Figure 1 is a plan view of my demonstrating camera complete; Fig. 2 is a side elevation of the same partly broken away; Fig. 3 is a detail showing in front elevation a lens tube and parts immediately associated therewith; and Fig. 4 is a detail showing a diaphragm having a small aperture and adapted for use in connection with the lens tube.

A camera box 5 is provided with a shoulder 6 integral therewith extending entirely around and bounded by an upwardly projecting bead 7 which is beveled slightly upon its inner face. Resting upon the shoulder 6 is a plate 9 of glass, the upper surface of which is ground so as to be translucent. The lower edge of an extension box 8 is provided with a beveled portion $8^a$ and is otherwise fitted upon the edges of the ground glass plate and upon the bead 7.

The camera box 5 is provided with an annular tube holder 10, and telescopically mounted within the latter is a lens tube 11 carrying a flanged portion 12, the latter being provided with an opening 13. Integral with the lens tube 11, and extending outwardly from the flanged portion 12 thereof, is a tray 14 provided with cells 15, $15^a$, for holding lenses of various kinds, as hereinafter explained. The cells 15 are slightly narrower than the cells $15^a$, as will be understood from Fig. 1. This is because I prefer to mount cylindrical lenses within the cells 15, and spherical lenses within the cells $15^a$. This is, however, for most purposes a matter of choice, or rather a matter of convenience and individual judgment.

At 16 is a diaphragm which is provided with a central opening 17 smaller than the opening 13. By placing the diaphragm 16 in some forward cell of the lens tube 11, the diaphragm 16 resting in a cell not the nearest to the camera box, (the cell next to the flange is for primary focusing always), the opening 17 is brought into axial alinement with the lens tube 11. The purpose of the diaphragm 16 is to reduce the degree of spherical aberration, the reduction being accomplished by reducing the amount of light which is admitted, and compelling all of the light to pass as near as possible to the approximate center of the lens. The diaphragm 16 is not generally employed when good light is not available, except when the camera is used for demonstrating the nature of spherical aberration, or when finer definition is desired. Several of these diaphragms, having apertures of different sizes, may be used.

It is always necessary to use a primary focusing lens. In most cameras there is a permanent focusing lens, but in my demonstrating camera there is not, as from the nature of the work to be done there is required sometimes a primary focusing lens of one power, and sometimes of another, as will be shown hereinafter. Besides this there are other important reasons why the lens tube 11 is not provided with a permanent lens. However, if it should be especially desired it could be so provided and the rest of the instrument built to correspond. This focusing lens is always placed in the rear cell next to the flange 12. Such lens is always a + spherical one. Other lenses in addition may be employed as may be necessary to produce such effect as is desired. The lens shown at 18 in Fig. 3, as usual with lenses employed by opticians, may be provided with a finger-piece 19 in order to facilitate the rotation of the lens in case of a cylindrical one, and its easy removal and replacement. The flanged portion 12 of the lens tube 11 is provided upon its front face with a graduated scale, preferably forming a half circle, as indicated in Fig. 3, and divided into 180 degrees, or other sub-divisions. The 0 mark on one side and the 180° mark on the other should be opposite marks provided at the side on the box, that is, they should be upon a horizontal line. The operator by grasping the finger-piece 19 and turning the lens upon its own axis, can rotate the axis of the lens relatively to its support, as will be understood from Fig. 3.

Mounted within the camera box 5 is a mirror support 20, carrying a mirror 21. Connected with the mirror support 20 is a slide rod 22, provided with a handle 23. The slide rod is further provided with graduations representing units and decimals therefor—in this instance, 4.00, 4.50, 5.00, 5.50, 6.00, 7.00, 8.00, 9.00, 10.00, 11.00, 12.00. The characters just quoted representing the dioptric power of a plus spherical primary focusing lens which will focus for distant objects on the ground glass screen 9, Fig. 2. In other words, the graduations upon the rod 22 represent the dioptric value of the primary focusing lens (always plus), which under proper conditions of adjustment, as elsewhere explained, will cause the camera to focus properly.

The operation of my device is as follows: I will suppose that the various parts are in their appropriate positions indicated in Fig. 2. It is important to see that the lens tube 11 is in place and is pushed as far inward as it will go, so that the flanged portion 12 abuts against the adjacent surface of the camera box. The 0 mark on the one side and 180° mark on the other are opposite marks on the box. See that the ground glass focusing screen 9 has its ground side upward and is properly placed in position, as indicated in Fig. 2. This being done, the following directions may be followed: Set the camera in such a position that it faces some distant landscape, building or other fixed object, preferably one well illuminated. Select as low a power primary focusing lens as the case will permit, so as to obtain as large an image as possible, and set this lens in the rear cell, that is, the one closest to the camera box 5, Throw a curtain over the camera so as to exclude as much light as practicable from the box, the operator looking downward through the opening in the extension box 8, moves the slide rod 22 so number and mark are just outside of camera box 5, corresponding with the dioptric power of primary focusing lens, for instance, 4.00 on rod indicates a +4.00 diopter lens to properly focus images on the screen 9; then view the image formed upon said screen.

A few practical instances will make clear the manner in which the device is used. For demonstrating simple hyperopia the slide rod 22 is moved in such position that the graduation number 4.00 is just visible outside of the camera box. A plus lens of 4.00 diopters is next selected. This lens may be either a trial case lens or even an accurate spectacle lens. The lens so selected is a primary focusing lens, and is used to place the camera in focus for the distant object or objects. This condition is the one which represents in the eye, emmetropia, or perfect refractive condition. The lens is placed in the position above described, that is, in cell next to the flanged portion 12 of the lens tube. The image now thrown upon the ground glass screen is, or should be perfect. The slide motion allowed in the lens tube 11, Fig. 2, is intended to compensate for focusing objects at a slightly nearer distance than that regularly intended, and so the slide may be drawn out slightly in such cases. Suppose now that the refractive condition of the patent's eye has been found perfect, that is, emmetropic, so that the eye focuses parallel rays of light upon the retina without any act of the accommodation; then this condition is so represented. But suppose instead, the patient's eyes are hyperopic 1.00 diopter requiring a plus 1.00 diopter spherical lens to correct it. Now, while the +1.00 diopter lens is yet on the face in the frame, move now the slide rod so that 5.00 is just outside of the camera box. Note the image; it is blurred. The camera has been shortened, so to speak, representing the short eye—hyperopia, 1.00 diopter. To prove the assertion take the +1.00 diopter lens from the face or trial frame on the face, and place in the cell of the camera in front of the primary focusing lens and note the result. The image clears. The patient sees you understand the condition, and sees the result better than words can explain it: Result, confidence.

In the case of myopia the device is used differently. Always see that the camera focuses properly by primary focusing lens. The slide rod 22 is set to indicate as many diopters from 4.00 as the amount of the myopia reckoned in diopters. For instance, if the myopia present in the eye of the patient is of a degree representing three diopters, the slide rod 22 is so placed as to indicate 7.00 diopters, or preferably a little more, say 8.00, to allow throwing the slide backward to an extent representing 3.00 diopters. Place a plus 8.00 spherical lens in the cell next to the flange for primary focusing lens. This brings the focus for distant objects. Now move the slide rod back to 5.00. Image is blurred greatly. This represents a long eye, or one having too great a refractive power for its axial length. Take a minus 3.00 diopter spherical lens and place in the cell. The image is clear.

In the case of simple astigmatism of the hyperopic variety, a minus sylindrical lens is employed to represent and constructionally produce the error found in the eye. In this case the slide rod is pushed forward, that is, toward the lens tube, so that the scale carried by the slide rod indicates a movement of the slide rod more than sufficient to compensate for the amount of astigmatism. For instance, instead of using a lens of 4.00 diopters in the case of requiring a correction of +1.50 diopters axis at 90°, I select a lens of +5.50 diopters or still better, a lens of +6.00 diopters. This lens is the primary lens above described, and set the slide rod to indicate 6.00. This brings the camera to a focus representing the emmetropic eye. Now place a lens of −1.50 cylinder in an appropriate cell and with its axis at 90°, and I have a case of simple hyperopic astigmatism, and there is found to exist a blurring of the horizontal meridian. Now to show that a lens of +1.50 sphere will not correct the image, such a lens is placed in a cell, in front of or behind the minus cylinder. The meridian at 180° just mentioned is corrected, but the other meridian at 90° is now found to be blurred. Now removing the +1.50 sphere, note the blurring again. Next take a lens of +1.50 cylinder, place it in position in the same cell, rotate the lens last inserted until its axis is at 90°. This restores the perfect image and as above stated in connection with other tests, proves the accuracy of the observation.

In simple myopic astigmatism and in mixed astigmatism the device is used differently. It appears to be unnecessary, however, to state in detail all of the various uses to which my invention may be applied, and I therefore do not deem it necessary to follow further this phase of the operation. Suffice it to say that I do not limit myself to any particular manner in which the mechanism may be employed, nor to a correction of any particular error or combination of errors, condition or combination of conditions, to be found in the eye. Nor do I limit myself to the particular construction shown, the scope of my invention being commensurate with my claims.

Having thus described my invention, I claim as new and desire to secure by Letters Patent:

1. A demonstrating camera comprising a camera box, a mirror holder slidably mounted therein, a mirror mounted upon said mirror holder, a slide rod connected with said mirror holder for the purpose of shifting the position of said mirror, said slide rod being provided with means whereby the degree of movement of said mirror relatively to said camera box may be indicated, a screen disposed adjacent to said mirror for the purpose of receiving an image projected by aid thereof, a lens tube provided with a tray for holding a number of lenses, the said lens tube being supported by said camera box.

2. A device of the character described, comprising a camera box, a mirror slidably mounted therein and movable at the will of the operator, means for indicating the position of said mirror relatively to said camera box, a lens tube movable relatively to said camera box and provided with a flanged portion, said flanged portion being provided with graduations, and a tray carried by said lens tube and provided with cells for holding lenses, said cells being of such form as to permit their rotation relatively to said graduations.

3. A device of the character described, comprising a camera box, a screen therefor, an extension box mounted upon said camera box and partly shielding said screen, a mirror movably mounted within said camera box and inclined relatively to said screen, means controllable at will for shifting the position of said mirror relatively to said screen, and for indicating the degree of movement of said mirror, and a lens tube for supporting the lens in suitable position to project an image upon said screen by aid of said mirror.

4. A device of the character described, comprising a camera box, a screen connected therewith, a mirror mounted within said camera box and movable relatively to the latter, a tube support mounted upon said camera box and having generally an annular form, said tube support being disposed adjacent to the path of travel of said mirror, a lens tube slidably mounted within said tube support, and a tray carried by said lens tube for supporting the lens.

5. A device of the character described, comprising a camera box, a screen connected therewith for receiving an image, a mirror mounted within said camera box and adjustable relatively to the same, a lens tube having a predetermined position relatively to the path of travel of said mirror, said lens tube being provided with a flanged portion having graduations disposed thereupon in substantially the form of a circle, and a tray carried by said flanged portion and extending therefrom for the purpose of supporting lenses.

6. A device of the character described, comprising a camera box, a screen connected therewith for receiving an image, a mirror mounted within said camera box, means controllable at the will of the operator for shifting the position of said mirror and for indicating the degree of movement thereof, a lens tube having a portion provided with an opening and also having a tray provided with cells, and a diaphragm fitting into one of said cells and provided with an opening smaller than said first mentioned opening, said tray being further provided with means for supporting a lens in axial alinement with said opening in said diaphragm.

7. A device of the character described, comprising a camera box, a screen connected therewith for receiving an image, a lens tube connected with said camera box and adapted to hold, one at a time, a number of primary focusing lenses of different powers, a movable mirror for casting an image upon said screen, said image being formed by aid of one of said lenses, and means for indicating the position of said screen relatively to said camera box.

8. A device of the character described, comprising a camera box, a screen mounted thereupon, a lens tube connected with said camera box and adapted to hold, one at a time, a number of primary focusing lenses of different powers, a mirror movably mounted within said camera box for the purpose of casting images upon said screen, a slide rod connected with said mirror for shifting the position of the latter relatively to said camera box, and means for indicating to the operator the position occupied by said mirror relatively to said camera box.

9. A device of the character described, comprising a camera box, a screen for the same, a lens tube for holding a number of testing lenses, one at a time, and a reflecting member mounted within said camera box and movable therein at the will of the operator for causing said testing lenses to form images upon said screen.

In testimony whereof I have signed my name to this specification in the presence of two subscribing witnesses.

HENRY LA FAYETTE FINZEL.

Witnesses:
C. A. SPANOGLE,
J. F. GREENAWALT.